Dec. 22, 1942.　　　　T. J. HEALY　　　　2,305,696
UNIVERSAL COUPLING
Filed Sept. 29, 1941　　　　4 Sheets-Sheet 1
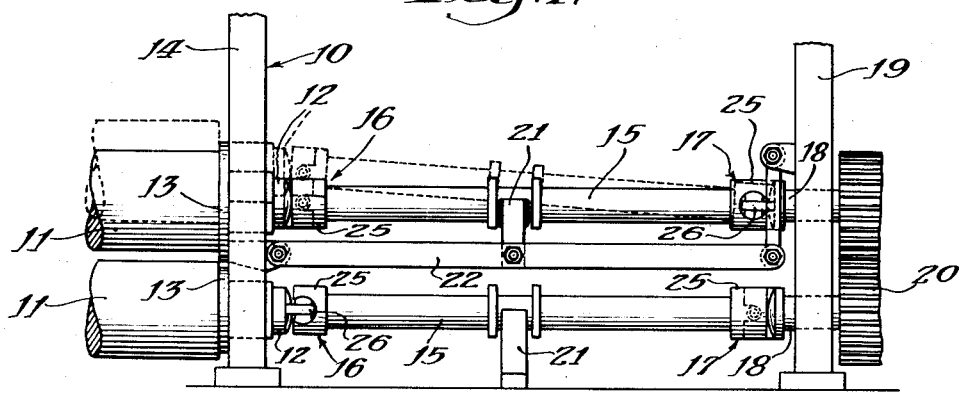
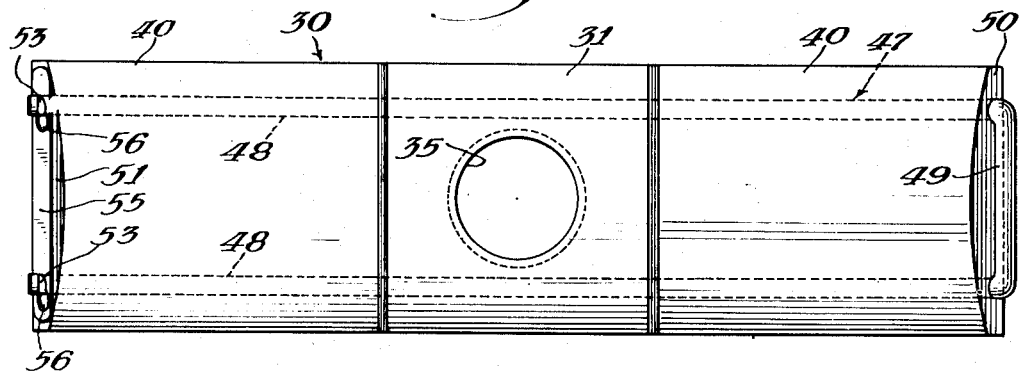
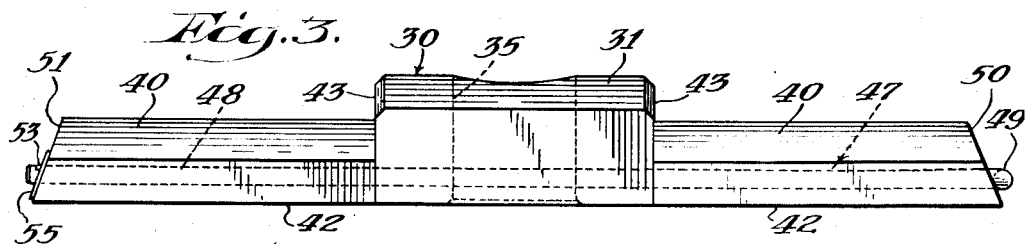
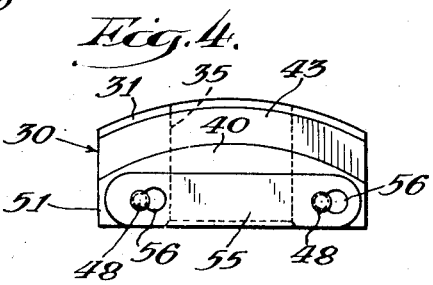
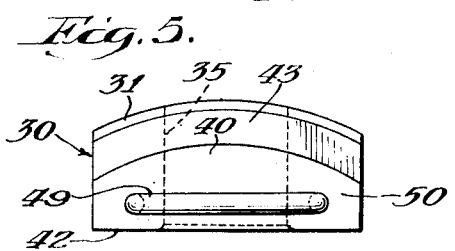
Inventor:
Thomas J. Healy
By Wallace & Cannon
Attorneys Dec. 22, 1942. T. J. HEALY 2,305,696
UNIVERSAL COUPLING
Filed Sept. 29, 1941 4 Sheets-Sheet 2
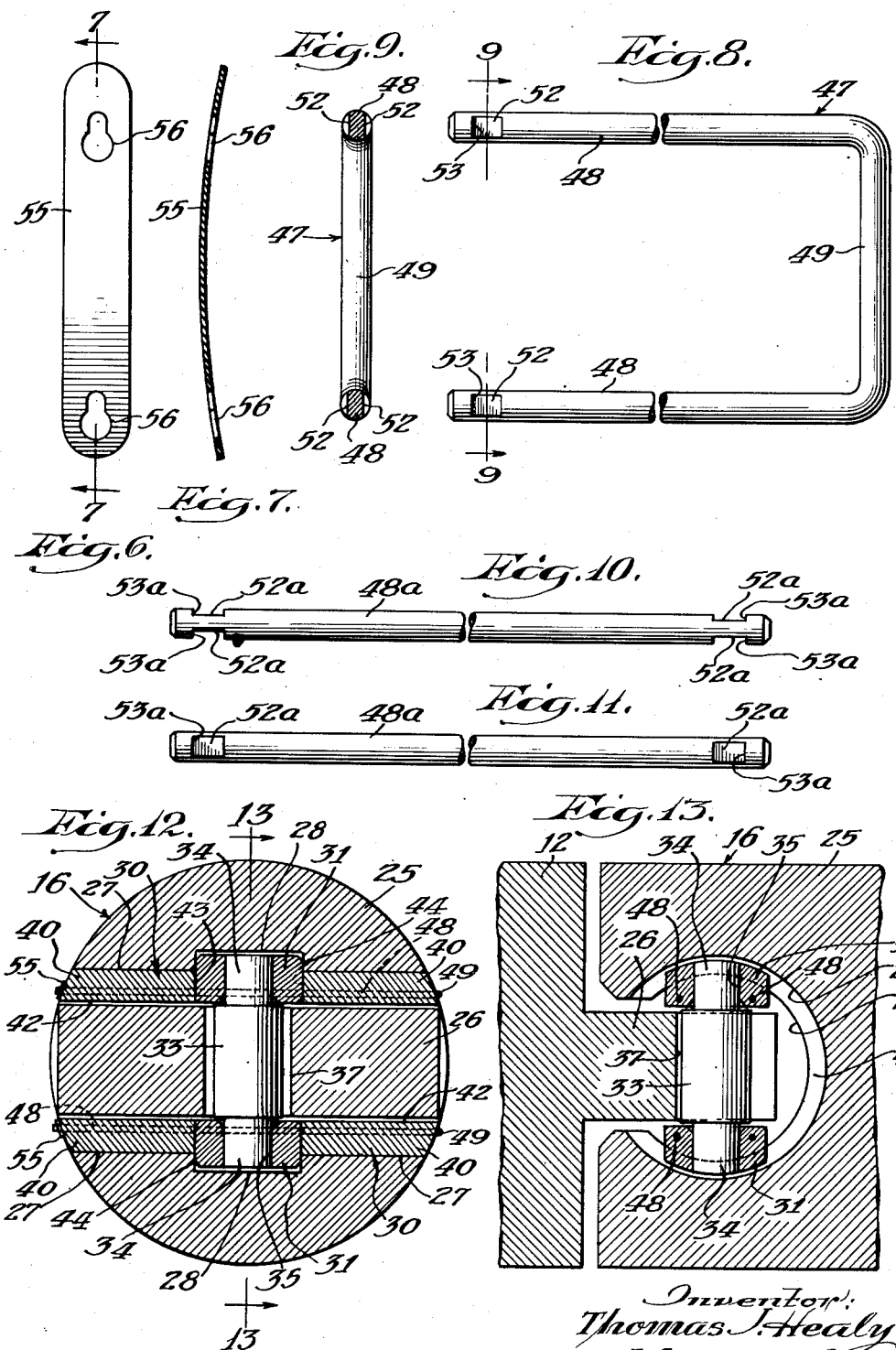

Dec. 22, 1942.  T. J. HEALY  2,305,696
UNIVERSAL COUPLING
Filed Sept. 29, 1941   4 Sheets-Sheet 3
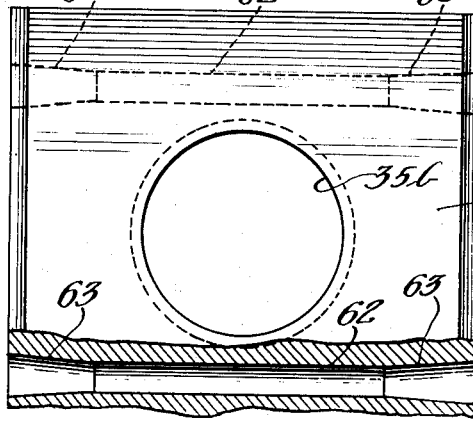
Fig. 14.
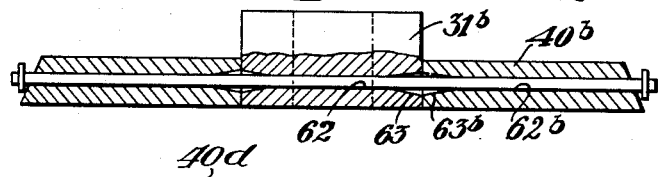
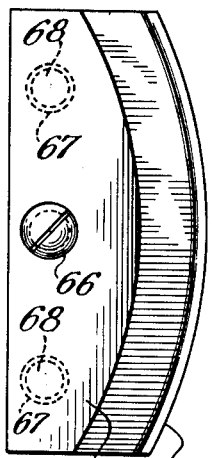
Fig. 16.
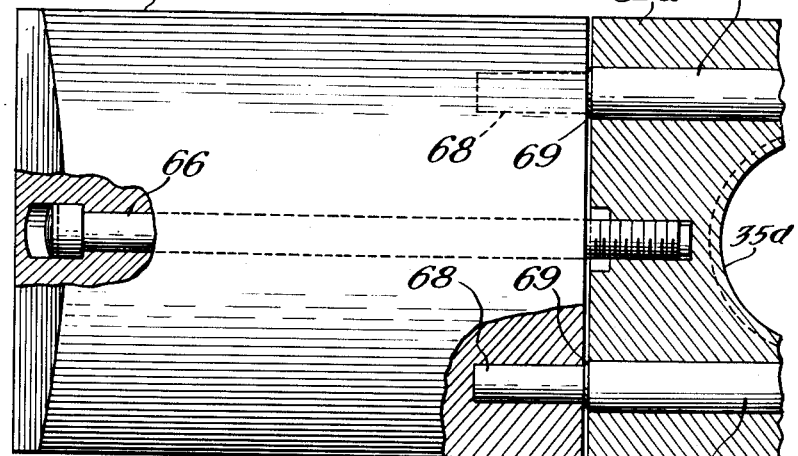
Fig. 15.
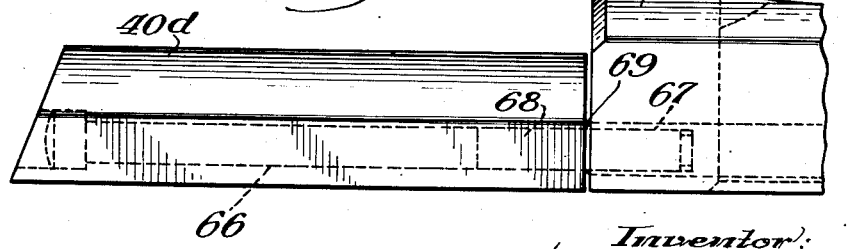
Fig. 17.
Inventor:
Thomas J. Healy
By Wallace & Cannon
Attorneys.

Dec. 22, 1942.   T. J. HEALY   2,305,696
UNIVERSAL COUPLING
Filed Sept. 29, 1941    4 Sheets-Sheet 4
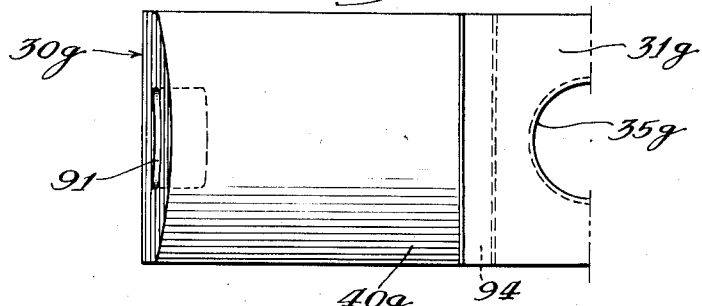
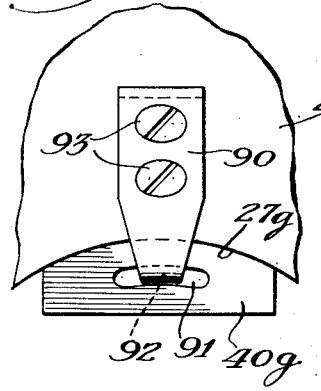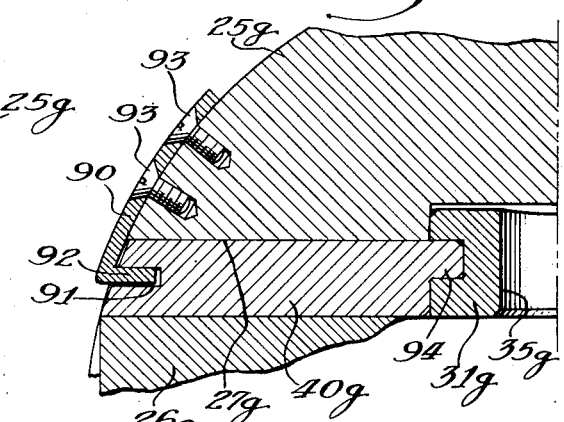
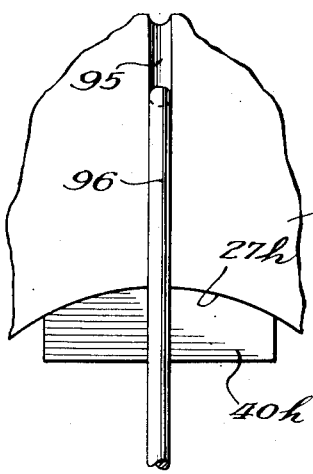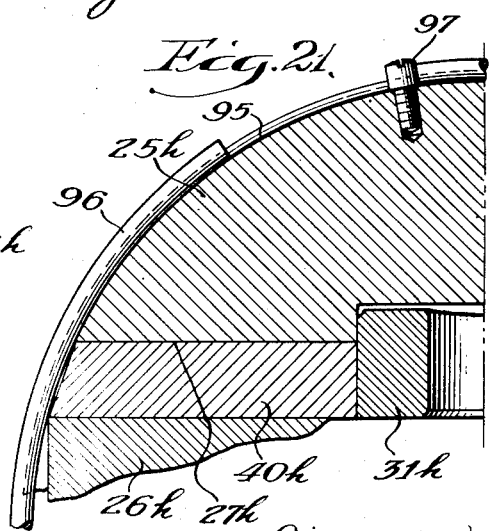
Inventor:
Thomas J. Healy
By Wallace & Cannon
Attorneys Patented Dec. 22, 1942

2,305,696

UNITED STATES PATENT OFFICE 2,305,696

UNIVERSAL COUPLING

Thomas J. Healy, Baltimore, Md., assignor to The American Brake Shoe and Foundry Company, Wilmington, Del., a corporation of Delaware Application September 29, 1941, Serial No. 412,750

28 Claims. (Cl. 64—7)

This invention relates to bearings and primarily to slipper bearings for universal joint connections and the like.

In instances where torque is to be transmitted from a driving shaft to a driven shaft where such shafts are arranged in end to end relation in such a way that they may move into angular relationship with each other, it is customary to interconnect the shafts by a universal joint or the like. One form of universal joint which has been used in such instance comprises a female member formed on or secured to an end of one of the shafts, and a male member is similarly provided on the adjacent end of the other shaft. In such a joint the male member is inserted into the female member and an interconnection therebetween is afforded by what are known as slipper bearings and also a pivotal interconnection and the arrangement is such that relative pivotal movement about axes at right angles to each other is afforded whereby a driving interconnection is maintained between the driving and driven parts of the joint when these parts move out of axial alignment one with the other.

Usually a flat fishtail or tongue is provided on the male member of a joint of the aforesaid character and a bifurcation is provided in the female member into which the aforesaid tongue is passed. Arcuate recesses are formed in opposed faces of the bifurcation in the female member and these recesses extend transversely across the bifurcation in the female member. Slipper bearings in the form of segments of a cylinder are disposed in the aforesaid recesses and the flat faces of such segments are disposed on opposite faces of the aforesaid tongue when it is extended into the bifurcation. A bearing or spacing pin centrally located with respect to the longitudinal extent of the slipper bearings and extended therebetween is received in a bifurcation or other suitable opening in the tongue and it is this that affords one of the axes about which parts may move upon disalignment of the driving and driven portions, the slipper bearings rotating in the aforesaid arcuate recesses to afford the other of the axes about which the relative pivotal movement may occur.

In what may well be referred to as the conventional type of slipper bearings heretofore employed in universal couplings of the aforesaid character, each bearing comprises a medial boss portion having an opening or socket for receiving an end of the aforesaid bearing pin, and two end sections which are integral with and extend in opposite directions from the boss. When such slipper bearings are employed where the male and female members of the coupling are operated continuously in the same direction of rotation over long periods of time, as in the case of continuous type steel rolling mills, for example, there is a tendency for one end section of each bearing to become badly worn or otherwise damaged while the boss and the other end section of the bearing are still in relatively good condition. Because of the one-piece construction of these conventional slipper bearings, it has been necessary, whenever such an end section of a bearing became badly worn or otherwise damaged so as to require replacement, to completely disassemble the universal coupling and to then replace the partially defective slipper bearing with an entire new bearing. Particularly where the shafting which is interconnected by the universal coupling is relatively heavy and cumbersome, such disassembly is quite difficult and entails considerable loss of time and consequent production delays. However, such disassembly of the coupling and replacement of an entire bearing may be avoided by so constructing the bearing that the end sections thereof may be readily detached from the boss thereof, whereby a worn or defective end section may be replaced by a new end section and to so constitute and arrange a slipper bearing is the primary object of my invention, and an object ancillary to this is to preserve the conventional design of the slipper bearings so that they may be used in existing universal couplings, but at the same time to render the end sections of each slipper bearing independently separable from the boss thereof.

A more specific object is to provide a three-piece slipper bearing comprising a medially located boss and two oppositely located end sections which are bolted or otherwise suitably secured to the boss while in service but which may be separated therefrom when the occasion demands.

A further object is to pass bolts or like retaining members through suitable holes extending longitudinally through the end sections and boss of each slipper bearing and to so design the bolt holes as to prevent shearing stresses and fatigue from acting on the bolts at the junctions of the boss and end sections.

A still further object is to so arrange the slipper bearings that the end sections thereof will be readily interchangeable.

Still another object is to maintain the end sections in proper relation to the boss of the slipper bearing by providing means mounted on the female member of the coupling for externally retaining the parts of the slipper bearing against separation when the bearing is in service.

A further object in this regard is to so arrange the retaining means that the end sections of a bearing may be readily removed from the coupling and replaced when desired without disassembling the coupling.

Yet other objects are to provide a slipper bearing of simple and economical construction and which will be efficient and practical in use.

Other and further objects of the present invention will be apparent from the following description and claims and will be understood by reference to the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a fragmental elevational view of a rolling mill and the driving means therefor;

Fig. 2 is a plan view of a slipper bearing embodying one form of my invention;

Fig. 3 is a side elevational view of the slipper bearing shown in Fig. 2;

Figs. 4 and 5 are end elevational views of the slipper bearing looking in from the left and right, respectively, in Fig. 3;

Fig. 6 is a plan view of a spring clip constituting part of the slipper bearing assembly;

Fig. 7 is a longitudinal sectional view of the clip taken on the line 7—7 on Fig. 6;

Fig. 8 is a plan view of one type of bolt which may be used to retain the relatively separable parts of the slipper bearing together;

Fig. 9 is a cross-sectional view taken on the line 9—9 on Fig. 8;

Figs. 10 and 11 are side elevational and plan views, respectively, of a different type of retaining bolt;

Fig. 12 is a transverse sectional view of a universal coupling and showing the manner in which the slipper bearings are arranged therein;

Fig. 13 is a longitudinal sectional view taken on the line 13—13 on Fig. 12;

Fig. 14 is a partially sectional plan view of a slipper bearing boss provided with flared bolt holes;

Fig. 14A is a sectional view illustrating a complete view illustrating a complete slipper bearing embodying the boss shown in Fig. 14;

Fig. 15 is a fragmentary, partially sectional plan view of a modified form of slipper bearing;

Fig. 16 is an end elevational view of the slipper bearing shown in Fig. 15;

Fig. 17 is a fragmentary, side elevational view of the slipper bearing shown in Fig. 15;

Fig. 18 is a fragmentary plan view of still another modified form of slipper bearing;

Fig. 19 is a fragmentary transverse sectional view of a universal coupling, illustrating in greater detail the slipper bearing shown in Fig. 18 and means for externally retaining the parts of the bearing against separation;

Fig. 20 is an end elevational view of the slipper bearing shown in Figs. 18 and 19 and its associated retaining means;

Fig. 21 is a transverse sectional view similar to Fig. 19 but illustrating a different type of slipper bearing and retaining means therefor; and Fig. 22 is an end elevational view looking from the left in Fig. 21.

A rolling mill of the character in which the slipper bearings of the present invention may be utilized, is fragmentally shown in Fig. 1. As therein illustrated the rolling mill 10 includes a pair of opposed rolls 11, the end portions or pintles 12 of which are journaled in bearings as 13 that are carried by the frame members as 14. These end portions 12 of the rolls 11 project beyond this frame member 14 and are connected by means of universal joints or couplings 16 to spindles 15, which are in turn connected by universal couplings 17 to stub shafts 18 that are carried by a frame member 19. A suitable driving means (not shown) is connected to the stub shafts 18 by means of gearing 20 for the purpose of rotatively driving the spindles 15 and connected rolls 11. Thrust or spindle carrier bearings 21 disposed between the frame members 14 and 19 support the spindles 15 at the middle portions thereof.

The bearings 13 which carry the upper rolls 11 are vertically adjustable in the frame members as 14 in order that the rolls 11 may be vertically spaced to accommodate varying thicknesses of material. The spindle carrier bearing 21 for the upper spindle 11 is supported by a linkage 22 which is so connected to the upper bearing 13 that this bearing 21 may continue to support the upper spindle 15 when it has been moved to a position such as that indicated by the broken line in Fig. 1. Driving connections between this spindle 15 and its associated roll 11 and stub shaft 18 are maintained by the respective universal couplings 16 and 17 even though these members are not in longitudinal alignment with each other.

Each universal coupling 16 or 17 includes a female member 25, which is formed on or secured to an end of a spindle as 15, and a male member 26 which is provided on the adjacent end of an associated stub shaft as 18 or a pintle as 12. As commonly constructed, the female member 25 is bifurcated as shown in Figs. 12 and 13 to receive the male member, which is in the form of a flat tongue 26. The branches of the bifurcation in the female member 25 are arcuately recessed as indicated at 27. Deeper recesses 28 are afforded in the female member 25 midway between the ends of the cylindrical recesses 27 in order to define shoulders as 44, for a purpose that will be explained hereinafter.

The slipper bearings generally designated 30 which are employed in such universal couplings include end sections 40 which are constructed approximately in the form of segments of a cylinder, and one of these end sections is disposed in each cylindrical recess 27 in each female member 25, on opposite sides of the deep recess 28. A medial portion or boss 31 is included in each slipper bearing 30 and this boss is of greater thickness than the end sections 40 of such bearing. Each such boss 31 is disposed in the deep recess 28 in the female member 25 so as not to ride the face of the deep recess while the end sections 40 are disposed in contact with the arcuate bearing surfaces within the cylindrical recesses 27, the convex surfaces of the end sections 40 therefore conforming with the arcuate bearing surfaces 27 when the slipper bearings are assembled in the coupling. A bearing or spacing pin 33 is interposed between the slipper bearings 30 to maintain these bearings in spaced relation, this pin 33 having reduced end portions 34 which are fitted in holes 35, Figs. 2 and 3, extending through the bosses 31. The shoulders on the pin 33 afforded by the reduced ends thereof serve to space the slipper bearings 30 in the coupling. The tongue 26 of the coupling is provided with a bifurcation or slot 37, Figs. 12 and 13, in which the pin 33 is disposed when the tongue 26 is inserted into the female member 25, clearance being afforded between the pin 33 and the tongue 26 to facilitate assembling the coupling and to enable the necessary freedom of movement of the parts relative to each other when the coupling is in service. The flat faces 42 of the slipper bearings 30 are disposed toward the adjacent faces of the tongue with a slipper bearing, therefore, disposed on each side of the tongue.

When the shafts which are interconnected by a universal coupling as 16 or 17, Fig. 1, are not longitudinally aligned, as is the case when the upper spindle 15 and roll 11 are in their broken-line positions, Fig. 1, the tongue 26 constantly changes its angular position relative to the female member 25 of such coupling as the shafts are rotated and this causes the slipper bearings 30 to rock back and forth rotatively within the cylindrical recesses 27 in the female member 25, Fig. 13. However, the slipper bearings 30 are restrained against longitudinal movement by the end faces 43 of the bosses 31 which abut the shoulders as 44 intermediate the recesses 27 and 28.

When the universal coupling is in service in a continuous type of steel rolling mill, for example, the tongue 26 tends to bear against only one of the end sections 40 of the slipper bearing 30, the other end section of such bearing being relatively free from such stress. As the more heavily stressed end sections 40 of the slipper bearings 30 rub against their cooperating bearing surfaces 27 in the female member 25, the material of which these bearing end sections are composed gradually wears away, the greatest amount of wear taking place at the outward extremities of the more heavily stressed end sections 40. On the other hand, those bearing end sections 40 which are not required to withstand the force applied by the tongue 26 undergo a negligible amount of wear. Likewise the rate of wear of the boss portions 31 is relatively slight. Therefore, the boss 31 and the end section 40, which is not under stress, are usually still in relatively good condition when the more heavily stressed end section 40 of a slipper bearing has become so worn as to be unfitted for further service. In such a case it is disadvantageous to discard an entire slipper bearing merely because one end section thereof has become badly worn or otherwise damaged.

Hence, I propose to make the end sections 40 and the boss 31 of each slipper bearing 30 as separate pieces that may be secured together in end to end relation as shown in Figs. 2 and 3, the boss 31 being medially located with respect to the end sections 40. A suitable securing means for this purpose is a U-shaped or hairpin bolt as that generally designated 47 (Figs. 2, 3 and 8) which includes a pair of elongated limbs 48 that are passed through aligned holes extending longitudinally through the end sections 40 and boss 31. The bight 49 of the bolt 47 engages an end face 50 of the slipper bearing 30, as shown in Figs. 2, 3 and 5, and the limbs 48 are of such length that they protrude slightly from the end face 51 at the opposite extremity of the slipper bearings 30. The limbs 48 are generally of round cross-section throughout, except that a portion of each limb intermediate the extremity thereof and the end face 51 is flattened, as indicated at 52, Figs. 8 and 9, to form shoulders as 53 which are spaced slightly from the end face 51, Fig. 3.

A spring clip 55, Figs. 6 and 7, having a pair of keyhole slots 56 is fitted on the protruding portions of the limbs 47 to retain the end sections 40 and boss 31 in place on the bolt 47. The clip 55 is formed of a curved piece of spring steel or like flexible material, and it is attached onto the bolt 47 by first aligning the enlarged part of the keyhole slots 56 with the ends of the limbs 48, then pressing the clip 55 flat against the end face 51 of the slipper bearing and sliding it laterally until the flattened portions 52 of the limbs 48 are received in the restricted parts of the keyhole slots 56, as shown in Fig. 4. The shoulders 53 of the limbs 48 prevent the clip 55 from assuming its natural curved shape, and thus the clip 55 is frictionally locked to the bolt 47 and serves to hold the end sections 40 and boss 31 of the slipper bearing firmly together on the bolt 47.

When the slipper bearings 30 are assembled in the universal coupling as shown in Fig. 12, the bearing pin 33 serves to maintain these bearings 30 in spaced relation on opposite sides of the tongue 26, the reduced portions 34 of the pin 33 being disposed between the limbs 48 of the bolts 47 as shown in Fig. 13. In the course of use of the slipper bearings there is a tendency for one end section 40 of each slipper bearing to become badly worn or otherwise damaged, whereas the boss 31 and the other end section 40 of such slipper bearing remain in fairly good condition, the section which becomes so worn being that which receives the thrust in the course of operation of the coupling. In this event it may be desired to remove the defective end section 40 and replace it with a new end section, or to interchange the end sections 40, without the necessity of removing the boss 31 from the universal coupling, since such removal of the boss 31 entails disassembling the entire coupling.

In order to remove an end section 40 without disturbing the boss 31, it is merely necessary to disengage the spring clip 55 from the bolt 47 by sliding the clip 55 laterally until the enlarged parts of the keyhole slots 56 are aligned with the limbs 48 of the bolt 47. The bolt 47 may then be withdrawn from the slipper bearing 30, thereby disconnecting the end sections 40 from the boss 31, or if it is desired to remove only the end section 40 nearest the free ends of the limbs 48, this obviously may be done without entirely removing the bolt 47. In this latter event the defective end section 40 may be conveniently grasped and withdrawn from the coupling and a new end section inserted in its place, whereupon the clip 55 is replaced on the ends of the limbs 48 and the slipper bearing 30 is again ready for service.

One advantage of using a U-shaped retaining member such as the bolt 47, Fig. 8, for holding the parts of the slipper bearing together is that only one locking member such as the spring clip 55, Fig. 6, need be employed. However, it will be apparent that if desired, the fore ends of the limbs 48 could be screw-threaded for the reception of nuts operable to clamp the parts of the assembly together. Moreover, there may be instances in which it is desired to arrange the slipper bearing so that each of the end sections 40 may be independently separated from the boss 31 without requiring withdrawal of the retaining member from the bearing, this being particularly advantageous where the wear may occur on both end sections as in instances where the coupling rotates in opposite directions in the course of use thereof. For this purpose the retaining members may be in the form of straight bolts as 48a, Figs. 10 and 11, which may be substituted for the limbs 48 of the hairpin bolt 47 shown in Fig. 2. The bolts 48a are provided at each end thereof with flats 52a defining shoulders 53a which are adapted to cooperate with spring clips as 55, Fig. 6, in the manner described hereinabove. Then, to remove an end section 40 of a slipper bearing from the universal coupling, it is merely necessary to loosen the adjacent clip 55 and withdraw the end section without disturbing the rest of the bearing structure. Of course, here again the ends of the bolts 48a could be screw-threaded for the reception of retaining nuts.

There may be some tendency toward shearing or fatigue of the bolts at the juncture of the end sections with the boss, but this may be obviated by arranging the boss in the manner in which the boss 31b, Fig. 14 is arranged, and of course the adjacent end of each end section could be similarly arranged, as illustrated in Fig. 14A. As shown in Figs. 14 and 14A, the extremities of the bolt holes 62 in the boss 31b are flared, as indicated at 63, to thereby eliminate the sharp edges at the free ends of these openings. Such flaring of the bolt holes 62 also facilitates guiding the bolts, as 48 or 48a, into the holes 62 through the boss when the bearing is being assembled and through flaring of the bolt holes 62b in the end section 40b, as at 63b, similar advantages may be gained with respect to the end sections.

Still another manner in which the end sections of a slipper bearing may be separably attached to the boss portion thereof is fragmentarily illustrated in Figs. 15, 16 and 17. Thus, each end section as 40d is provided with a single bolt 66 which is passed through a bolt hole extending longitudinally through the end section 40d along the center line thereof. The head of the bolt 66 is disposed near the outer extremity of the end section 40d and the threaded end thereof is received in a suitable tapped opening in the boss 31d. In order to keep the end section 40d properly aligned with the boss 31d, centering pins 67 are anchored in the boss 31d and protrude therefrom to be received at their ends in snugly fitting sockets in the end sections as 40d. Preferably two pins 67 are employed, these pins passing longitudinally through the boss 31d one on each side of the center hole 35d therein and protruding at each end thereof from the boss. If it is desired to afford a slight amount of clearance between the boss 31d and the end sections 40d for enabling distribution of a lubricant or for any other purpose, this may be accomplished by making the portions of the pins 67 which are adapted to extend into the sockets in the end sections 40d of slightly reduced diameter so as to provide tapered shoulders 69 on the pins 67. The edges of the aforesaid sockets in the end sections 40d adjacent the boss 31d are pressed against the tapered shoulders 69 when the bolt 66 is tightened, and thus the end sections 40d are prevented from engaging the boss 31d while at the same time being firmly connected thereto.

In the embodiment of the invention illustrated in Figs. 18, 19 and 20, the end sections as 40g of each slipper bearing 30g are not directly attached to the boss 31g by retaining members such as bolts, but instead each end section is externally retained against separation from the boss by a retaining device such as the strap 90 which is attached by screws 93 to the exterior surface of the female member 25g and extends past the open end of the recess 27g in which the adjacent end section 40g of the slipper bearing is disposed. Each end section 40g has an arcuate slot 91 in the outer end thereof to receive a hooked end portion 92 of the associated strap 90. The slot 91 is of such length, as compared with the width of the hooked end 92, as to afford ample clearance for enabling the end section 40g to rock back and forth in the recess 27g when the universal coupling is driven rotatively.

As will be noted from Fig. 19, the tongue 26g of the coupling tends to support the end sections as 40g and hence it is not essential to secure the end sections 40g to the boss 31g so long as the external retaining members such as the strap 90 are provided. However, in order to afford additional support for the end sections 40g without securing them to the boss 31g, it may be desirable to provide each end section 40g with a tenon 94 which is adapted to fit into a complementary mortise in the boss 31g. In such an arrangement the end sections 40g are effectively restrained against displacement relative to the bosses 31g without being secured thereto. The bosses 31g of the paired slipper bearings are, of course, maintained in spaced relation by a bearing pin (not shown) in the manner described hereinabove.

Still another way in which the parts of each slipper bearing may be retained against separation is illustrated in Figs. 21 and 22. In these views the mortise and tenon joints between the end sections as 40h and boss 31h have been omitted and the end sections as 40h are shown as being disposed adjacent the boss 31h but entirely disconnected therefrom. A peripheral groove 95 is formed in the female member 25h in alignment with the open ends of recesses as 27h therein, and a ring 96 is disposed in this groove 95. The ring 96 is not continuous but is interrupted for a distance sufficient to enable an end section as 40h to be inserted in or withdrawn from the space between the tongue 26h and the female member 25 when the gap in the ring 96 is disposed opposite such end section. Normally the ring 96 is prevented from assuming a position to enable separation of the end sections as 40h from their boss 31h, by means of a screw 97 which is threaded into a tapped opening in the female member 25h at the bottom of the groove 95. The ring 96 is thus effective to retain the end sections 40h against longitudinal displacement with respect to their bosses 31h, except when an end section is to be replaced, in which event the screw 97 is removed and the ring 96 is shifted into the position just described to enable withdrawal of the end section.

With respect to the forms of slipper bearings wherein the component parts of each bearing are externally retained against separation, as shown in Figs. 18 to 22, it will be understood that, in assembling a coupling including slipper bearings of this character, the boss portions are first arranged in their operative positions spaced by the usual bearing or separating pin. Thereafter the tongue or fishtail of the male member is inserted into the bifurcation in the female member with the bifurcation in the tongue embracing the bearing pin. This affords support for the end sections of the slipper bearings which are thereafter passed into the recesses therefor into association with their cooperating bosses, and then the retaining means for preventing displacement of the end sections are arranged in retaining position.

From the foregoing it will be apparent that I have provided a slipper bearing structure embodying many novel and advantageous features, foremost among which is the three-piece construction of each slipper bearing which enables the end sections thereof to be removed from the universal coupling without disassembling the coupling. While thus rendering the end sections of each slipper bearing separable from the medial boss portion thereof, I have nevertheless preserved the conventional form of the slipper bearings so that they may be utilized in standard universal couplings without necessitating any reshaping of the male and female members of the coupling. The separate end sections of each slipper bearing may be maintained against longitudinal displacement relative to the boss in a number of ways, for example, as shown in Figs. 2 to 9, inclusive, by a U-shaped bolt as 47, the limbs of which are passed longitudinally through the end sections and boss of the slipper bearing and are fastened to a cooperating means, such as a spring clip 55, to retain the parts of the bearing against separation from the boss while in service. If desired, straight bolts as shown in Figs. 10 and 11 may be utilized in lieu of the U-shaped bolt, thereby enabling either end section to be removed without removing the bolts from the slipper bearing. Figs. 15 to 17 illustrate another manner of attaching the end sections to the boss by means of bolts or like retaining members. In Figs. 18 to 22 the end sections are not directly secured to the boss of the bearing, but are maintained against outward displacement by retaining devices disposed on the exterior surface of the female member of the coupling.

Thus, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof, the combination of a pair of slipper bearings respectively disposed, and restrained against longitudinal movement, in the arcuate recesses and including convex faces to conform with the recesses and also having flat faces respectively disposed toward opposed flat faces of said tongue, each of said slipper bearings comprising a medial part and two separate end sections disposed at opposite sides of said medial part and extending therefrom, a bearing pin extended through the opening in said tongue and into the medial parts of said bearings, and releasable means for normally retaining each end section against displacement relative to the medial part of the bearing of which such end section is a part, said means being releasable to enable withdrawal of any of said end sections from the recess in which it is mounted without removing the tongue of the coupling from the female member thereof.

2. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at the medial parts thereof, the combination of a pair of slipper bearings respectively disposed in the arcuate recesses and including convex faces to conform therewith and also having flat faces respectively disposed toward opposed flat faces of said tongue, each of said slipper bearings comprising a medial boss portion and two separate end sections disposed at opposite sides of said boss and extending therefrom, said bosses being of greater thickness than said end sections and being disposed in the deepened parts of the arcuate recesses in said female member, a bearing pin extended through the opening in said tongue and into the bosses of said bearings, and releasable means for normally retaining each end section against displacement relative to the medial part of the bearing of which such end section is a part, said means being releasable to enable withdrawal of any of said end sections from the recess in which it is mounted without removing the associated boss from the female member of the coupling.

3. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at the medial parts thereof, the combination of a pair of slipper bearings respectively disposed in the arcuate recesses and including convex faces to conform therewith and also having flat faces respectively disposed toward opposed flat faces of said tongue, each of said slipper bearings comprising a medial boss portion and two separate end sections disposed at opposite sides of said boss and extending therefrom, said bosses being of greater thickness than said end sections and being disposed in the deepened parts of the arcuate recesses in said female member, a bearing pin having a body portion extended through the opening in said tongue and including reduced portions at opposite ends of said body and which pin is formed with shoulders at the junctures of said body and end portions, said bosses having openings therein in which the end portions of said pin are respectively fitted to thereby enable said shoulders to maintain the bosses in spaced relation, and releasable means for normally retaining each end section against displacement relative to the medial part of the bearing of which such end section is a part, said means being releasable to enable withdrawal of any of said end sections from the recess in which it is mounted without removing the associated boss from the female member of the coupling.

4. In a universal coupling including a bifurcated female member and a male member comprising a flat tongue adapted to be received in such bifurcation and which tongue has an opening therein for the reception of a bearing pin and wherein the branches of the bifurcation have opposed arcuate recesses therein that extend transversely and to the free edges thereof and which recesses are deepened at the medial parts thereof, the combination of a pair of slipper bearings respectively disposed in the arcuate recesses and including convex faces to conform therewith and also having flat faces respectively disposed toward opposed flat faces of said tongue, each of said slipper bearings comprising a medial boss portion and two separate end sections disposed at opposite sides of said boss and extending therefrom, said bosses being of greater thickness than said end sections and being disposed in the deepened parts of the arcuate recesses in said female member, a bearing pin having a body portion extended through the opening in said tongue and including reduced portions at opposite ends of said body and which pin is formed with shoulders at the juncture of said body and end portions, said bosses having openings therein in which the end portions of said pin are respectively fitted to thereby enable said shoulders to maintain the bosses in spaced relation, and means firmly connecting each end section to the medial part of the bearing of which such end section is a part whereby said end sections are supported in the aforesaid recesses by reason of the support of said bosses by said bearing pin, the means firmly connecting said end sections to said bosses being releasable to enable withdrawal of any of said end sections from the recess in which it is mounted without removing the associated boss from the female member of the coupling.

5. In a universal coupling of the character described, a slipper bearing comprising a boss portion and at least one separate end section disposed at one side of said boss and extending therefrom longitudinally of such bearing, and releasable means restraining said end section against longitudinal displacement relative to said boss.

6. In a universal coupling of the character described, a slipper bearing comprising a boss portion and at least one separate end section disposed at one side of said boss and extending therefrom longitudinally of such bearing, at least one elongated retaining member extended through said boss and end section, and means cooperating with said retaining member to restrain said end section against longitudinal displacement relative to said boss.

7. In a universal coupling of the character described, a slipper bearing comprising a boss portion and at least one separate end section disposed at one side of said boss and extending therefrom longitudinally of such bearing, and means releasably mounted on an element of said coupling to restrain said end section against longitudinal displacement relative to said boss.

8. A slipper bearing for use in a universal coupling of the character described and comprising a medial boss portion, two separate end sections disposed at opposite sides of said boss and extending therefrom, and means releasably connecting said end sections to said boss and releasable to enable separation of said end sections from said boss without removing said boss from a universal coupling in which the bearing is installed.

9. A slipper bearing for use in a universal coupling of the character described and comprising a medial boss portion, two separate end sections disposed at opposite sides of said boss and extending therefrom, means releasably connecting said end sections to said boss and releasable to enable separation of said end sections from said boss without removing said boss from a universal coupling in which the bearing is installed, and means for spacing at least one of said end sections from said boss.

10. A slipper bearing for use in a universal coupling of the character described and comprising a medial boss portion, two separate end sections disposed at opposite sides of said boss and extending therefrom, means releasably connecting said end sections to said boss and releasable to enable separation of said end sections from said boss without removing said boss from a universal coupling in which the bearing is installed, and spacing means interposed between said end sections and said boss for spacing apart adjacent faces of the end sections and the boss.

11. A slipper bearing for use in a universal coupling of the character described and comprising a medial boss portion, two separate end sections disposed at opposite sides of said boss and extending therefrom, and elongated retaining members extending through aligned holes afforded in said end sections and boss for attaching said end sections to said boss, said retaining members being constituted and arranged to enable said end sections to be detached from said boss and separated therefrom without removal of the boss from the coupling in which the bearing is installed.

12. A slipper bearing for use in a universal coupling of the character described and comprising a medial boss portion, two separate end sections disposed at opposite sides of said boss and extending therefrom, a U-shaped bolt having limbs passing through said end sections and said boss and protruding from one extremity of the bearing, the bight of said bolt engaging the opposite extremity of the bearing, and releasable means attached to the protruding portion of said limbs for positively retaining said end sections in fixed relation to said boss.

13. A slipper bearing for use in a universal coupling of the character described and comprising a medial boss portion, two separate end sections disposed at opposite sides of said boss and extending therefrom, a U-shaped bolt having limbs passing through said end sections and said boss and protruding from one extremity of the bearing, the bight of said bolt engaging the opposite extremity of the bearing, and a spring clip fastened to the protruding portions of said limbs and engaged with the adjacent end of the slipper bearing to retain said end sections and said boss against separation, said spring clip being releasable to enable separation of said end sections from said boss when desired.

14. A slipper bearing for use in a universal coupling of the character described and comprising a medial boss portion, two separate end sections disposed at opposite sides of said boss and extending therefrom, bolts passed through said end sections and said boss and extended beyond the free ends of said end sections, and releasable means attached to the protruding portions of said bolts for positively retaining said end sections in fixed relation to said boss.

15. A slipper bearing for use in a universal coupling of the character described and comprising a medial boss portion, two separate end sections disposed at opposite sides of said boss and extending therefrom, bolts extending from opposite sides of said boss and through said end sections, and spring clips fastened to the protruding ends of said bolts and engaged with the adjacent end section to retain said end sections and said boss against separation, said spring clips being releasable to enable separation of said end sections from said boss when desired.

16. A slipper bearing for use in a universal coupling of the character described and comprising a medial boss portion, two separate end sections disposed at opposite sides of said boss and extending therefrom, means extended through said end sections and detachably connected to said boss for securing said end sections to said boss, and means for effecting and maintaining alignment between said end sections and said boss.

17. A slipper bearing for use in a universal coupling of the character described and comprising a medial boss portion, two separate end sections disposed at opposite sides of said boss and extending therefrom, means extended through said end sections and detachably connected to said boss for securing said end sections to said boss, and means extending in parallel relation with the securing means for effecting and maintaining alignment between said end sections and said boss.

18. A slipper bearing for use in a universal coupling of the character described and comprising a medial boss portion, two separate end sections disposed at opposite sides of said boss and extending therefrom, means extended medially through said end sections and detachably connected to said boss for securing said end sections to said boss, and means for effecting and maintaining alignment between said end sections and said boss.

19. A slipper bearing for use in a universal coupling of the character described and comprising a medial boss portion, two separate end sections disposed at opposite sides of said boss and extending therefrom, means extended medially through said end sections and detachably connected to said boss for securing said end sections to said boss, and means spaced from and extending in parallel relation with the securing means for effecting and maintaining alignment between said end sections and said boss.

20. A slipper bearing for use in a universal coupling of the character described and comprising a medial boss portion, two separate end sections disposed at opposite sides of said boss and extending therefrom, means extended through said end sections and detachably connected to said boss for securing said end sections to said boss, and means for effecting and maintaining alignment between said end sections and said boss and operable to space apart adjacent faces of said end sections and said boss.

21. A slipper bearing for use in a universal coupling of the character described and comprising a medial boss portion, two separate end sections disposed at opposite sides of said boss and extending therefrom, means extended medially through said end sections and detachably connected to said boss for securing said end sections to said boss, and means spaced from and extending in parallel relation with the securing means for effecting and maintaining alignment between said end sections and said boss and operable to space apart adjacent faces of said end sections and said boss.

22. A slipper bearing for use in a universal coupling of the character described and comprising a medial boss portion, two separate end sections disposed at opposite sides of said boss and extending therefrom, pins fitted in said boss and protruding therefrom longitudinally of said end sections, said end sections being formed with sockets for receiving said centering pins to be guided thereby when assembled in operative relation to said boss, and bolts passed through said end sections and screwed into said boss to retain said end sections in fixed relation to said boss.

23. A slipper bearing for use in a universal coupling of the character described and comprising a medial boss portion, two separate end sections disposed at opposite sides of said boss and extending therefrom, pins fitted in said boss and protruding therefrom longitudinally of said end sections, said end sections being formed with sockets for receiving said centering pins to be guided thereby when assembled in operative relation to said boss, bolts passed through said end sections and screwed into said boss to retain said end sections in fixed relation to said boss, and shoulders on said pins and cooperating with said end sections to space said end sections from said boss.

24. A slipper bearing for use in a universal coupling of the character described and comprising a medial boss portion, two separate end sections disposed at opposite sides of said boss and extending therefrom, said boss and said end sections having openings extended therethrough, and fastening means passed through said holes and secured in position to prevent separation of said end sections from said boss, at least selected of the openings in said end sections and said boss being tapered adjacent the merger thereof to relieve shearing stress on said fastening means.

25. A slipper bearing for use in a universal coupling of the character described and comprising a medial boss portion, two separate end sections disposed at opposite sides of said boss and extending therefrom, and bolts extending through aligned holes afforded in said end sections and said boss for attaching said end sections to said boss, the bolt holes in said boss being tapered at each end thereof to relieve the bolts of shearing stresses at the junctions of said boss with said end sections when the slipper bearing is in service.

26. An end section for use as an element of a multi-section slipper bearing or the like and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having at least one opening extended therethrough from the end edges thereof and having at least one other opening therein extended in parallel relation with the first named opening and inwardly from at least one end edge thereof, said openings being adapted to receive means for securing said element to, and locating it with respect to, other of the sections of the bearing.

27. An end section for use as an element of a multi-section slipper bearing or the like and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having an opening extended therethrough from the end edges and disposed substantially medially between said side edges and having at least one other opening therein extended in parallel relation with the first named opening and inwardly from one end edge and disposed between the first named opening and a side edge, said openings being adapted to receive means for securing said element to, and locating it with respect to, other of the sections of the bearing.

28. An end section for use as an element of a multi-section slipper bearing or the like and comprising a substantially rectangular body having side and end edges and oppositely disposed bearing faces, one of said bearing faces being substantially flat and extended to said side and end edges and the other of said bearing faces extending between said end edges and being arcuate transversely of said side edges and extended thereto, said body having an opening extended therethrough from the end edges and disposed substantially medially between said side edges and having at least one other opening therein extended in parallel relation with the first named opening and inwardly from one end edge and disposed between the first named opening and a side edge, said openings being adapted to receive means for securing said element to, and locating it with respect to, other of the sections of the bearing.

THOMAS J. HEALY.